United States Patent
Kurian et al.

(10) Patent No.: US 10,402,892 B2
(45) Date of Patent: Sep. 3, 2019

(54) RESOURCE DELIVERY VIA AUTOMATED CHANNEL AND VIRTUAL RECORD

(71) Applicant: Bank of America Corporation, Charlotte, NC (US)

(72) Inventors: Manu Jacob Kurian, Dallas, TX (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 314 days.

(21) Appl. No.: 15/365,105

(22) Filed: Nov. 30, 2016

(65) Prior Publication Data

US 2018/0150900 A1    May 31, 2018

(51) Int. Cl.
*G06Q 30/06*    (2012.01)
*G06Q 20/20*    (2012.01)
*G06Q 10/08*    (2012.01)
*H04L 29/06*    (2006.01)
*H04W 4/02*    (2018.01)

(52) U.S. Cl.
CPC ....... *G06Q 30/0635* (2013.01); *G06Q 10/083* (2013.01); *G06Q 20/202* (2013.01); *H04L 63/08* (2013.01); *H04W 4/02* (2013.01)

(58) Field of Classification Search
CPC ............. G06Q 30/0635; G06Q 20/202; G06Q 10/083; H04L 63/08
USPC ........................... 705/21; 235/380–384, 379; 709/220–223
See application file for complete search history.

(56) References Cited

U.S. PATENT DOCUMENTS

| | | | | |
|---|---|---|---|---|
| 7,013,469 B2* | 3/2006 | Smith | ..................... | G06F 9/465 719/315 |
| 7,058,897 B2* | 6/2006 | Matsuda | ................ | G06Q 10/10 715/753 |
| 7,195,153 B1 | 3/2007 | Green et al. | | |
| 7,866,544 B1 | 1/2011 | Block et al. | | |
| 7,873,573 B2* | 1/2011 | Realini | .................. | G06Q 20/04 235/379 |
| 8,037,299 B2* | 10/2011 | Becker Hof | ........... | H04L 63/08 713/155 |
| 8,249,965 B2* | 8/2012 | Tumminaro | ........... | G06Q 20/12 705/35 |
| 8,255,499 B2 | 8/2012 | Cacheria, III et al. | | |
| 8,333,321 B2* | 12/2012 | Gressel | .................. | G06Q 10/02 235/382 |

(Continued)

*Primary Examiner* — Andrew Joseph Rudy
(74) *Attorney, Agent, or Firm* — Michael A. Springs; Moore & Van Allen PLLC; Nicholas C. Russell

(57) ABSTRACT

A resource delivery system typically includes a processor, a memory, and a resource delivery module stored in the memory. The system is typically configured for: receiving a request from a first user to transfer resources to a second user; authenticating the first user to initiate the transfer of the resources; creating a virtual record and associating a record of the second user with the virtual record; transferring the resources to the virtual record via an automated channel; identifying an event and provide the second user in response to identifying the event at least one option comprising using the resources in the virtual record; and moving the resources from the virtual record via the automated channel based on identifying that the second user selected the option comprising using the resources stored in the virtual record.

20 Claims, 8 Drawing Sheets

(56) References Cited

U.S. PATENT DOCUMENTS

| | | | | |
|---|---|---|---|---|
| 8,543,973 B2* | 9/2013 | Nguyen | ................... | G06F 21/41 |
| | | | | 717/104 |
| 8,630,617 B2* | 1/2014 | Raleigh | ................ | H04M 15/00 |
| | | | | 455/406 |
| 8,818,833 B2* | 8/2014 | Druyan | ............ | G06Q 10/06311 |
| | | | | 700/102 |
| 8,868,455 B2* | 10/2014 | Raleigh | .............. | G06Q 30/0601 |
| | | | | 705/34 |
| 9,137,701 B2* | 9/2015 | Raleigh | ............... | H04L 41/0893 |
| 9,235,967 B1 | 1/2016 | Magee et al. | | |
| 9,324,002 B2* | 4/2016 | Ryan | ........................ | G06K 9/46 |
| 9,604,563 B1 | 3/2017 | Wilson, II et al. | | |
| 9,647,918 B2* | 5/2017 | Raleigh | ............... | H04L 43/0876 |
| 9,674,731 B2* | 6/2017 | Raleigh | ............... | H04L 41/0893 |
| 9,710,804 B2* | 7/2017 | Zhou | .................... | G06Q 20/322 |
| 9,980,146 B2* | 5/2018 | Raleigh | ................ | H04W 12/12 |
| 10,057,775 B2* | 8/2018 | Raleigh | ................ | H04W 12/12 |
| 2011/0153115 A1 | 6/2011 | Inderrieden et al. | | |
| 2012/0067946 A1 | 3/2012 | Johnston | | |
| 2014/0121830 A1 | 5/2014 | Gromley et al. | | |
| 2017/0337782 A1 | 11/2017 | Nelson, Jr. et al. | | |

\* cited by examiner

RESOURCE DELIVERY VIA AUTOMATED CHANNEL AND VIRTUAL RECORD

FIELD OF THE INVENTION

The present invention embraces a resource delivery system that includes a processor, a memory, and a resource delivery module stored in the memory. The system is typically configured for: receiving a request from a first user to transfer resources to a second user; authenticating the first user to initiate the transfer of the resources; creating a virtual record and associating a record of the second user with the virtual record; transferring the resources to the virtual record via an automated channel; identifying an event and provide the second user in response to identifying the event at least one option comprising using the resources in the virtual record; and moving the resources from the virtual record via the automated channel based on identifying that the second user selected the option comprising using the resources stored in the virtual record.

BACKGROUND

Transfer of physical resources can be a time consuming process. Thus, there exists a need for an improved system.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for delivering resources via an automated channel and a virtual record.

In one aspect, the present invention embraces a computerized system, and an associated method and computer program product for delivering resources. The system includes a processor, a memory, and a network communication device. In one embodiment, the resource delivery system is configured for: receiving a request from a first user to transfer resources to a second user; authenticating the first user to initiate the transfer of the resources; creating a virtual record and associate at least one record of the second user with the virtual record; transferring the resources to the virtual record via an automated channel; identifying an event and provide the second user, in response to identifying the event, at least one option, wherein the at least one option comprises using the resources in the virtual record; and moving the resources from the virtual record via the automated channel based on identifying that the second user selected the option comprising using the resources stored in the virtual record.

In one particular embodiment, identifying the event comprises determining that the transfer of the resources to the virtual record has been completed.

In one particular embodiment, the system further comprises an automated resource delivery vehicle in communication with the computer apparatus, wherein the automated resource delivery vehicle comprises a control system and a propulsion system; the software module stored in the memory comprises executable instructions that when executed by the processor cause the processor to move the resources by determining a location for delivering one or more physical items corresponding to the resources available in the virtual record and transmitting a control signal to the automated resource delivery vehicle based on determining the location; the automated resource delivery vehicle is configured in response to receiving the control signal to deliver the one or more physical items corresponding to the resources in the virtual record to the location.

In one particular embodiment, determining the location comprises receiving the location from a user device of the second user.

In one particular embodiment, the system further comprises a computer terminal in communication with the computer apparatus, and wherein the software module stored in the memory comprises executable instructions that when executed by the processor cause the processor to move the resources by transmitting a control signal to the computer terminal, wherein the control signal causes the computer terminal to dispense a physical item corresponding to the resources in the virtual record.

In one particular embodiment, the software module stored in the memory comprises executable instructions that when executed by the processor cause the processor to notify the second user of the resources available in the virtual record based on transferring the resources to the virtual record via the automated channel.

In one particular embodiment, the virtual record is a single use account.

In one particular embodiment, the event is initiated by the second user on a first device.

In one particular embodiment, the first device is a point of transaction device operated by a merchant, wherein the event comprises initiation of a transaction by the second user via the point of transaction device, and wherein moving the resources comprises transferring the resources in the virtual record to a record associated with the merchant.

BRIEF DESCRIPTION OF THE DRAWINGS

Figure 1:
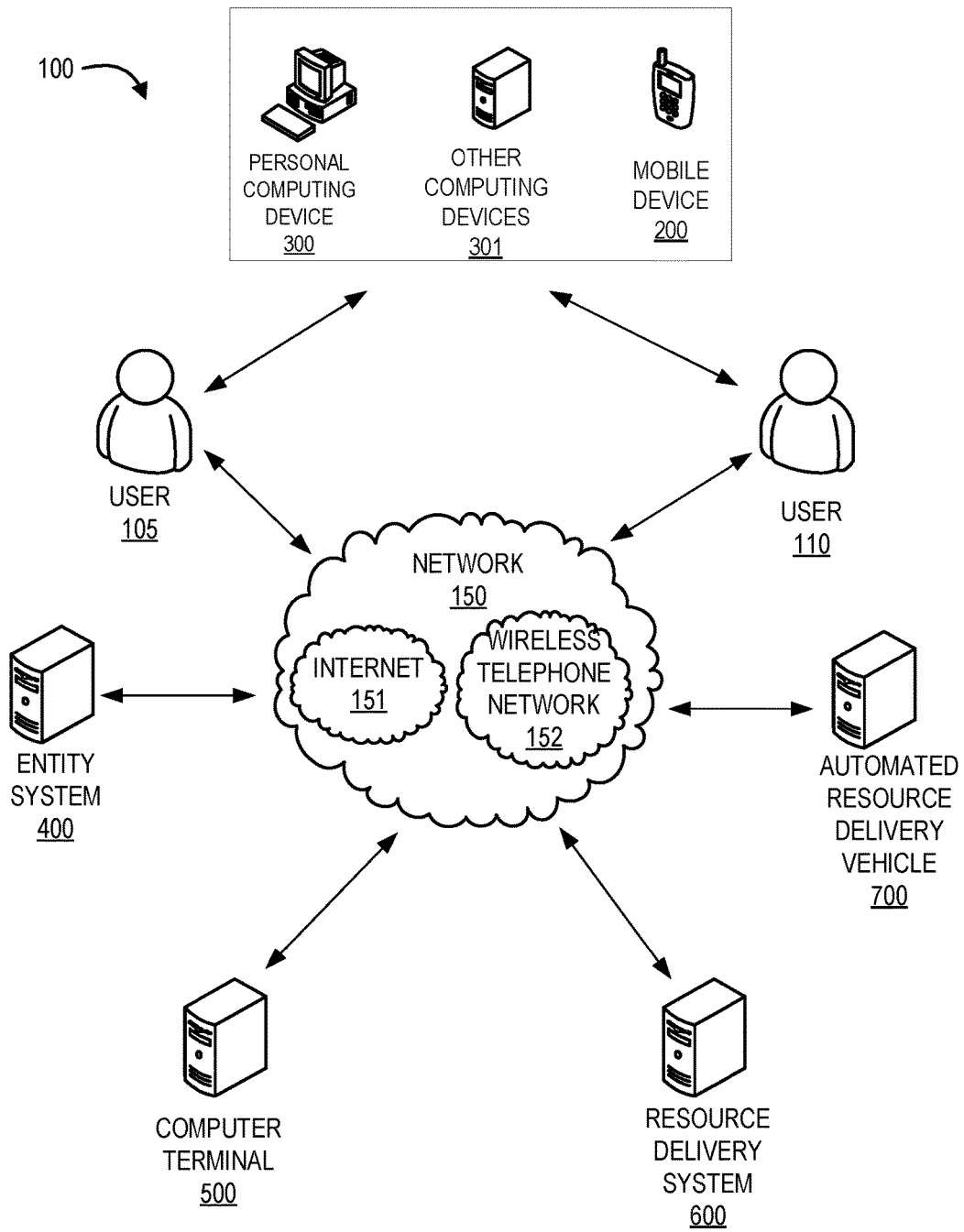
Figure 2:
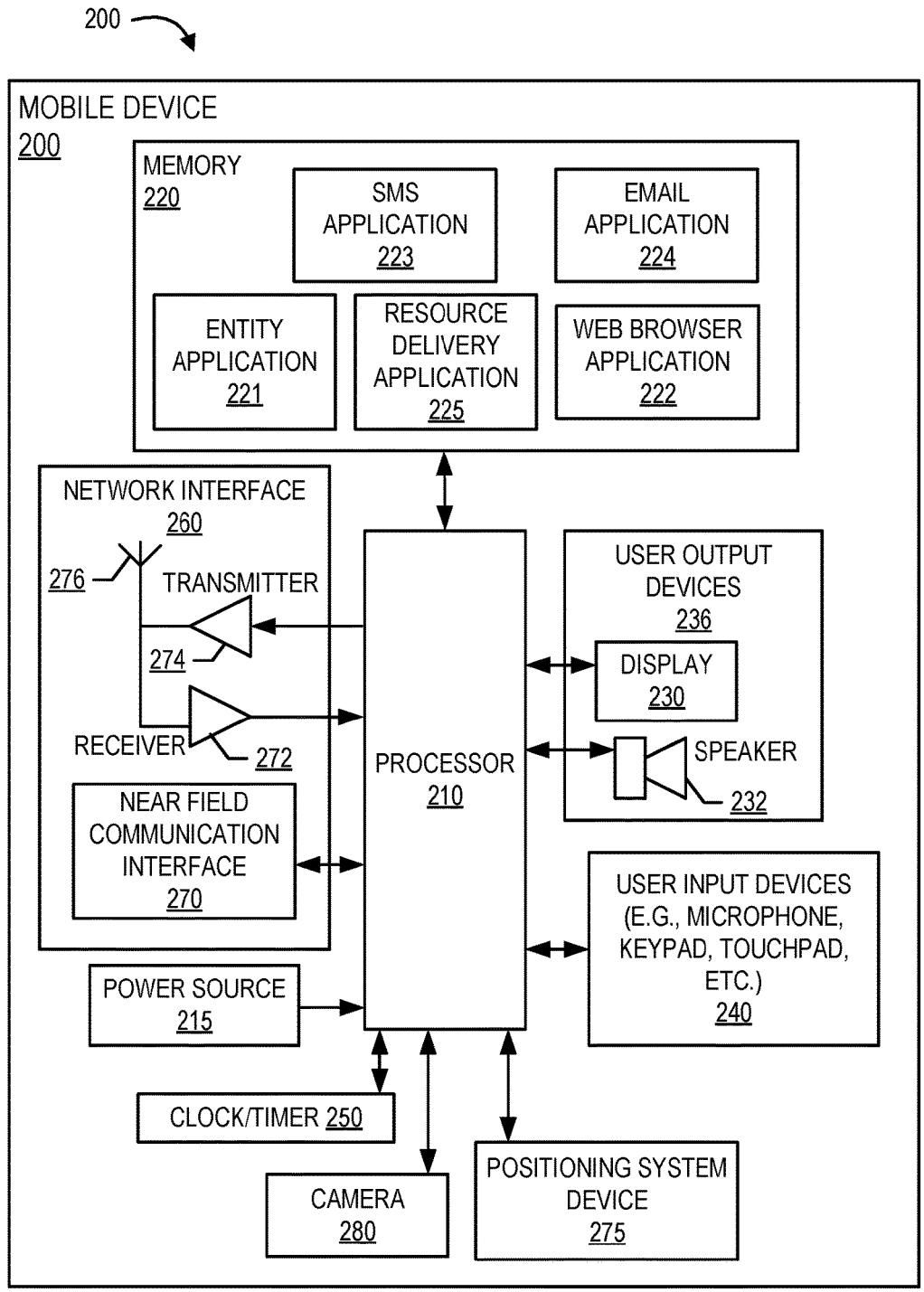
Figure 3:
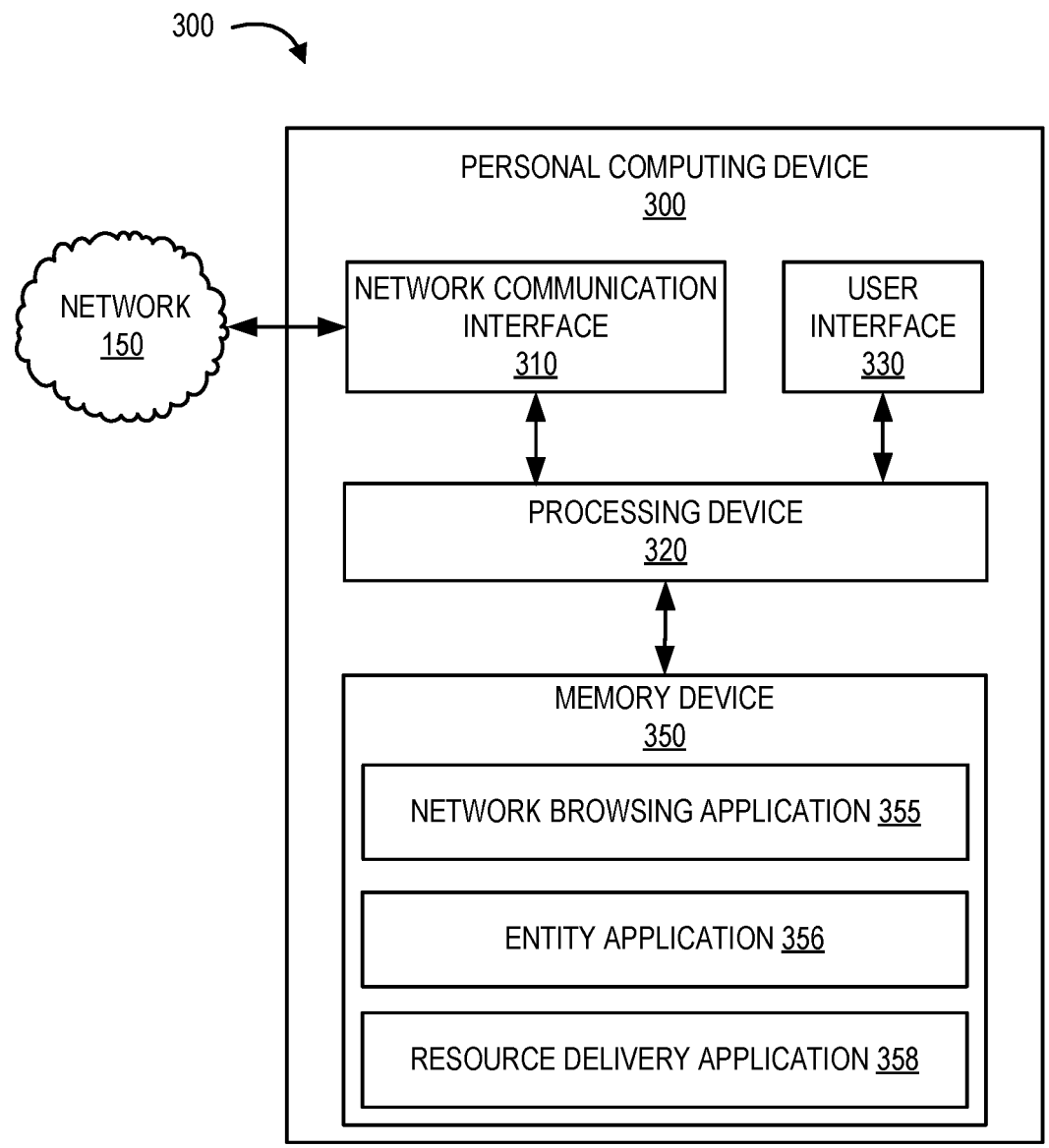
Figure 4:
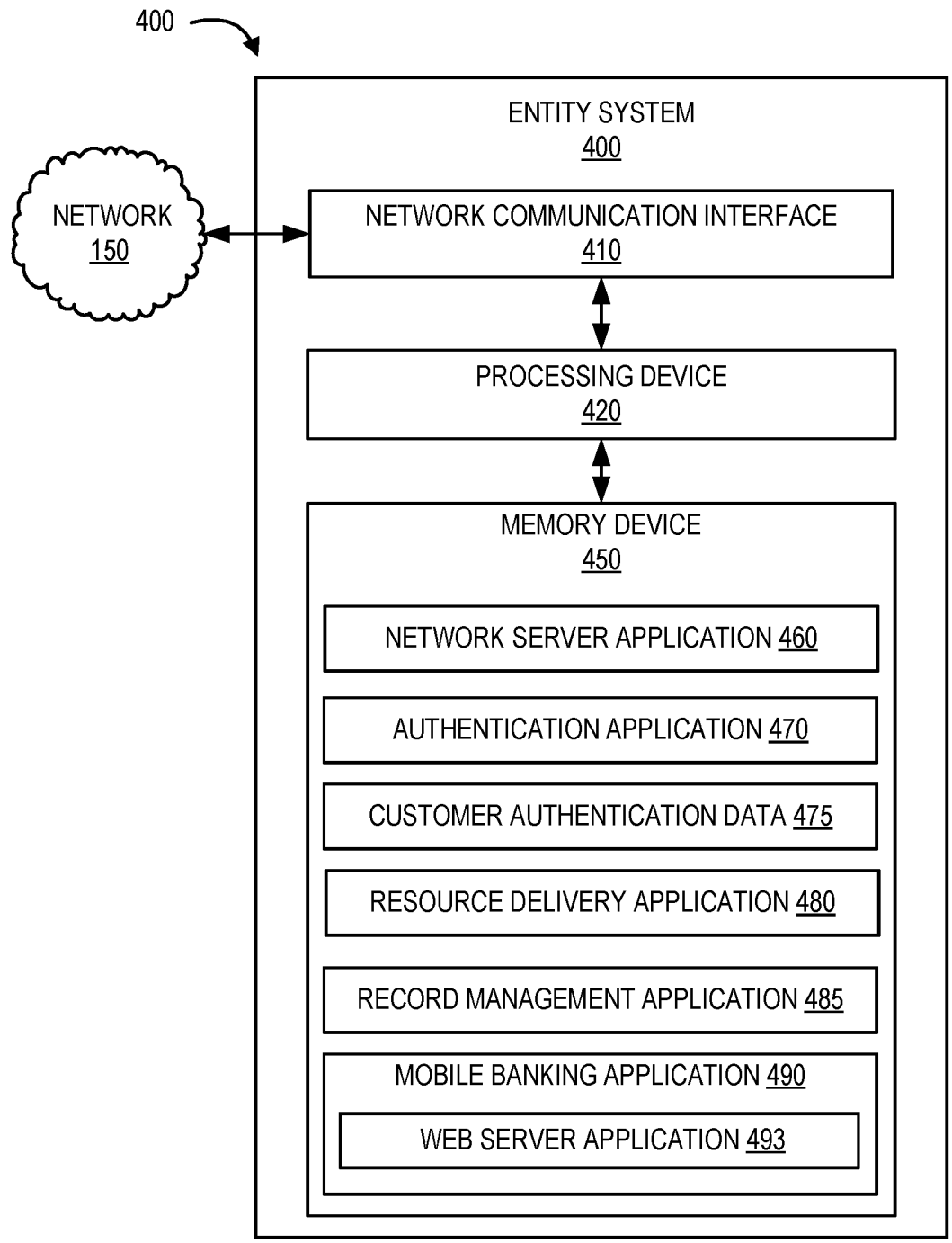
Figure 5:
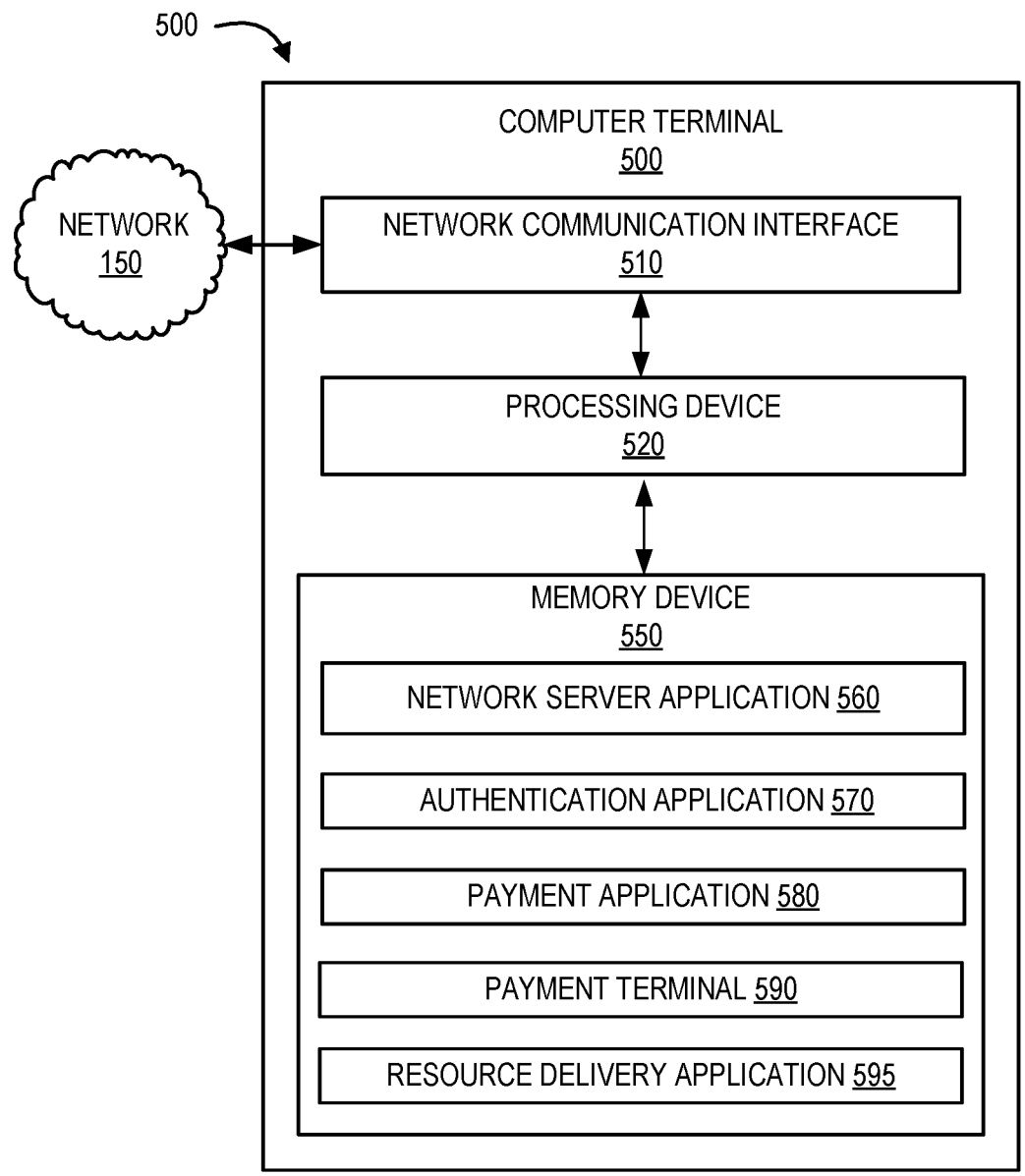
Figure 6:
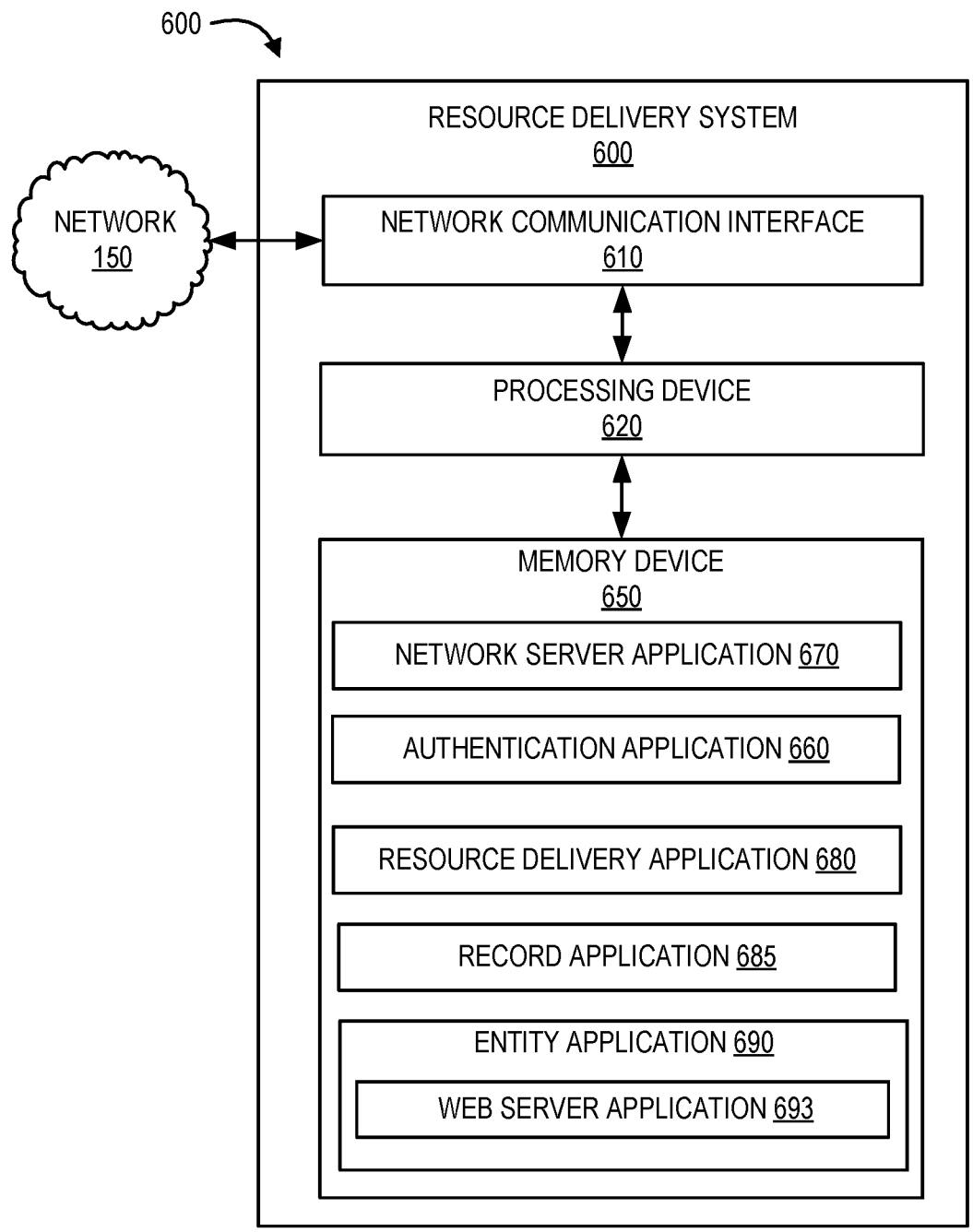
Figure 7:
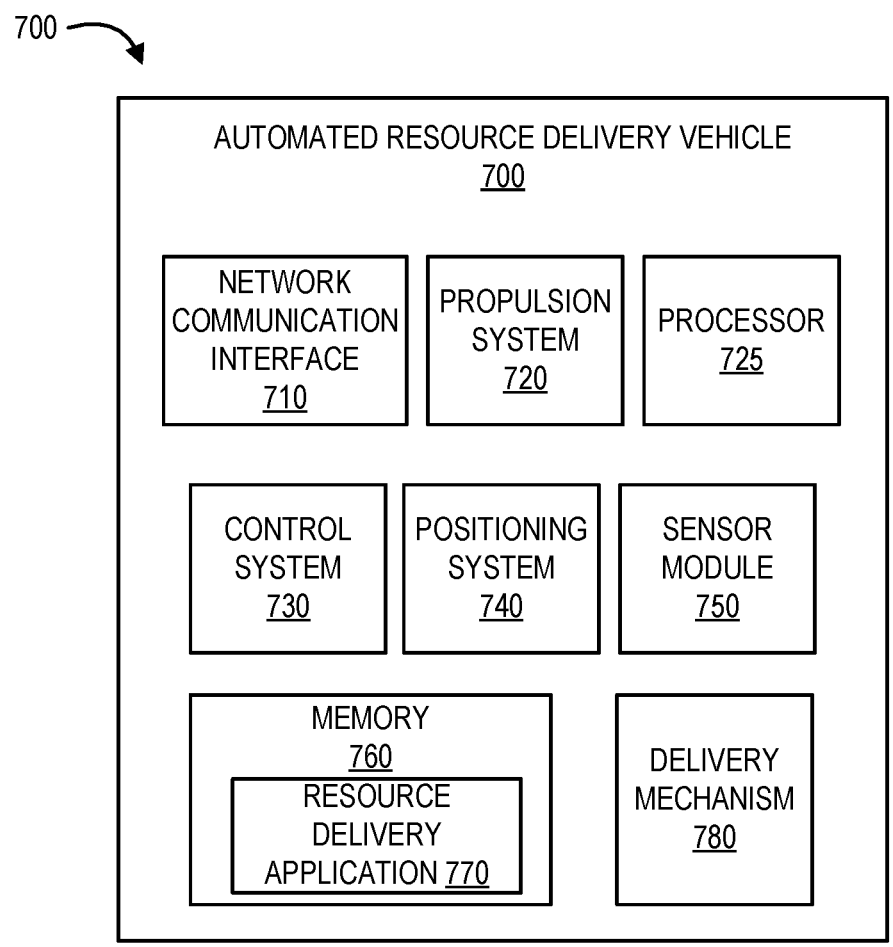
Figure 8:
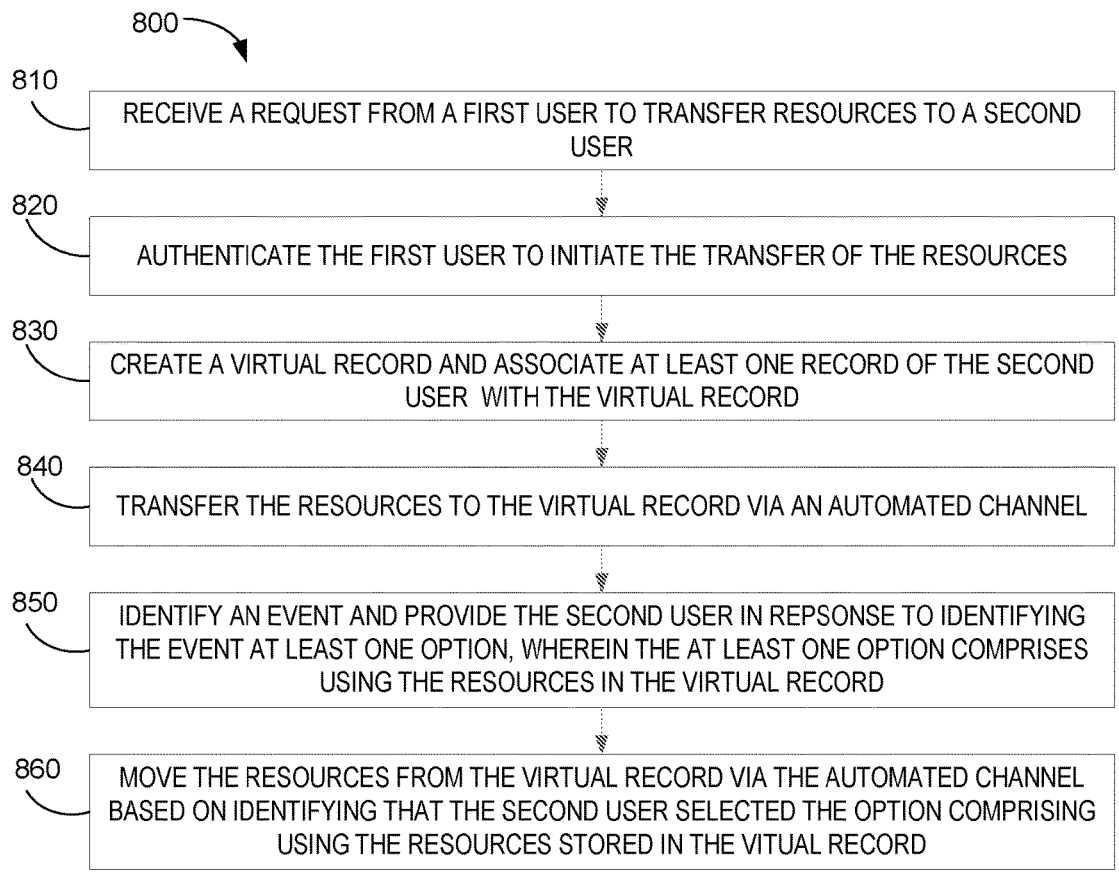

Having thus described some embodiments of the present invention in general terms, reference will now be made to the accompanying drawings, where:

FIG. 1 presents a resource delivery system environment, in accordance with one embodiments of the present invention;

FIG. 2, presents a block diagram illustrating a mobile device of a user illustrated in FIG. 1, in accordance with embodiments of the present invention;

FIG. 3 presents a block diagram illustrating a computing device of a user illustrated in FIG. 1, in accordance with embodiments of the present invention;

FIG. 4 presents a block diagram illustrating the entity system(s) of FIG. 1, in accordance with embodiments of the present invention;

FIG. 5 presents a block diagram illustrating the computer terminal of FIG. 1, in accordance with embodiments of the present invention;

FIG. 6 presents a block diagram illustrating the resource delivery system of FIG. 1, in accordance with embodiments of the present invention;

FIG. 7 presents a block diagram illustrating the automated resource delivery vehicle of FIG. 1, in accordance with embodiments of the present invention;

FIG. 8 presents a process flow for delivering resources via automated channel and virtual record, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" and "third party system" may include any organization that processes financial transactions including, but not limited to, banks, credit unions, savings and loan associations, investment companies, stock brokerages, asset management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, an "account" or a "record" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity.

In accordance with embodiments of the invention, an "event" or "event request" or "electronic event" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, purchase of goods or services, a return of goods or services, a payment transaction, a credit transaction, or other interactions involving user's resource or account. In the context of financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; receiving remittances; loading money onto stored value cards (SVCs) and/or prepaid cards and/or international travel cards; paying salary to employees; donating to charities; and/or the like. Unless specifically limited by the context, a "transaction", a "transfer of funds", an "event", an "event request", a "transfer of resources" or "point of transaction event" refer to any activity initiated between a user and a resource entity or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions has already occurred, is in the process of occurring or being processed, or it has yet to be processed/posted by one or more financial institutions.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Many of the embodiments and example embodiments thereof described herein are directed towards solving a problem of one individual delivering physical resources to another individual. For example, an individual may want to provide cash to another individual. Delivery of physical resources via mail or other delivery means may be a time consuming process. In some cases, the location of a recipient may be a remote place not readily accessible by any conventional delivery means. Although an individual may transfer money electronically, such electronic transfers may not be desirable when the sender wishes to send physical cash. The resource delivery system described herein provides a solution to these problems by facilitating transfer of physical resources (e.g., cash, check, or the like) to any location including remote locations using an automated resource delivery vehicle, a computer terminal (e.g, point of transaction device, Automated Teller Machine), and/or the like.

Another problem associated with delivery of physical resources is that once the physical resources have been transferred by the sender using the conventional delivery means, there is no option of reversing the transfer. The resource delivery system described herein provides a solution to such a problem by transferring resources to a virtual record before delivering the physical resources to the recipient, thereby providing the sender an option of reversing the transfer until the resources have been utilized by the recipient. In one embodiment, the resource delivery system described herein causes the computer terminal to dispense physical resources from the virtual account.

FIG. 1 provides a block diagram illustrating an environment 100 for a resource delivery system. As depicted in FIG. 1, the operating environment 100 typically includes a resource delivery system 600 interacting with an entity system 400, a computer terminal 500, an automated resource delivery vehicle 700, a user 105, a user 110, using a network 150. In some embodiments, the resource delivery system 600 may be maintained by the entity. In some embodiments, the resource delivery system 600 may be owned by the entity and maintained by a third party. In some embodiments, the resource delivery system 600 may be a part of the entity system 400. In some embodiments, the user 105 and user 110 may be customers of the entity. In some embodiments, the user 105, the user 110 or any one of a plurality of users may be a sender of the resources. In another embodiments, the user 105, the user 110 or any one of the plurality of users may be a recipient of the resources. In some embodiments, the automated resource delivery vehicle 700 and the computer terminal 500 may be owned and maintained by the entity system 400. In alternate embodiments, the automated resource delivery vehicle 700 and the computer terminal 500 may be owned by the entity and maintained by a third party. In some embodiments, the system environment may include other third party systems and other entity systems. In some embodiments, the resource delivery system 600 may interact with a plurality of users associated with the entity or a third party.

The environment 100 also may include a plurality of user devices. The user devices may include any machine, apparatus, system or the like that may be connected to and communicate with other devices over a network 150. At least one of the devices may include a personal computing device 300, other computing devices 301, and a mobile device 200 for use by the user 105, user 110. The computing devices 301 may be any device that employs a processor and memory and can perform computing functions, such as a personal computing device 300 or a mobile device 200, that may be connected to or access the network 150. The personal computing device 300 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may include any mobile communication device, such as a cellular telecommunications device (i.e., a cell phone or mobile phone), personal digital assistant (PDA), a mobile Internet accessing device, tablet computer, or other mobile device. A mobile device may connect to the network by a cellular telecommunications network or by Wi-Fi, Bluetooth or other access technology.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the mobile device 200. In some embodiments, the NFC interface 270 is not supported in and/or on the mobile device 200, but the NFC interface 270 is otherwise operatively connected to the mobile device 200 (e.g., where the NFC interface 270 is a peripheral device plugged into the mobile device 200). Other apparatuses having NFC interfaces mentioned herein may be configured similarly. In some embodiments, the NFC interface 270 of the mobile device 200 is configured to contactlessly and/or wirelessly communicate information to and/or from a corresponding NFC interface of another apparatus (e.g., an automated teller machine (ATM) or another mobile or computing device).

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a location to determine that the mobile device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which include computer-executable instructions/code executed by the processor 210 to implement the functions of the mobile device 200 and/or one or more of the process/method steps described herein. The memory 220 includes an entity application 221 that may be used to allow communication with an entity system such as the entity system 400 and/or the smart devices to implement the system of the invention. The use of the entity application 221 may facilitate access to the system of the invention by providing log-in systems including user authentication systems, account information, system controls or the like. The memory 220 includes a resource delivery application 225 that may be used to communicate with the resource delivery system 600. The entity application 221 and resource delivery application 225 communicate with the resource delivery system 600 and the entity system 400 to allow the user to set up and/or control the system of the invention. In some embodiments, the entity application 221 is an online banking application.

These applications also typically provide a graphical user interface (GUI) on the display 230 that allows the user 110 to communicate with the mobile device 200, the entity system 400 and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with an entity system 400 and resource delivery system 600.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional network browsing application 355, an entity application 356, a resource delivery application 358 and/or the like. The entity application 356 may be used to allow communication with an entity system, such as the entity system 400. The resource delivery application 358 may be used to allow communication with the resource delivery system 600 and the entity system 400 to implement one or more actions. The other computing devices 301 as shown in FIG. 1 may include similar system blocks as the personal computing device 300.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the entity system 400 described herein. For example, in one embodiment of the entity system 400, the memory device 450 includes, but is not limited to, a network server application 460, an authentication application 470, customer authentication data 475, a resource delivery application 480, a record management application 485, and a mobile banking application 490 including a mobile web server application 493, and other computer-executable instructions or other data. The computer-executable program code of the network server application 460, the authentication application 470, or the mobile banking application 490 may instruct the processing device 420 to perform certain logic, data-processing, and data-storing functions of the entity system 400 described herein, as well as communication functions of the entity system 400. The mobile banking application 490 communicates with the user devices to facilitate communication between the user and the entity.

In one embodiment, the network server application 460, the authentication application 470, and the mobile banking application 490 are configured to invoke or use the customer authentication data 475 when authenticating a user to the entity system 400. In some embodiments, the resource delivery application 480 allows communication with the resource delivery system 600 via an automated channel created by the resource delivery system 600 using the network communication interface 410. In one embodiments, the record management application 485 manages a set of records associated with a plurality of users created by the resource delivery system 600.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the personal computing device 300, and/or other computing devices 301. The processing device 420 is configured to use the network communication interface 410 to transmit and/or receive data and/or commands to and/or from the other devices connected to the network 150.

FIG. 5 illustrates block diagram illustrating a computer terminal 500 in greater detail, in accordance with an embodiment of the invention. The computer terminal 500 may be an Automated Teller Machine, a point of transaction device or any other device capable of performing functions similar to the point of transaction device or the automated teller machine. As illustrated in FIG. 5, in one embodiment of the invention, the computer terminal 500 includes a processing device 520 operatively coupled to a network communication interface 510 and a memory device 550. In certain embodiments, the computer terminal 500 is operated by a merchant or other commercial entity or entity system 400 that may enter into transaction with the user 105 and the user 110.

It should be understood that the memory device 550 includes, but is not limited to a network server application 560, an authentication application 570, a payment application 580, a payment terminal 590, and a resource delivery application 595. The computer-executable program code of the network server application 560, the payment application 580, the resource delivery application 595 may instruct the processing device 520 to perform logic, data-processing, and data-storing functions of the computer terminal 500 described herein, as well as communication functions of the computer terminal 500. The resource delivery application 595 communicates with the resource delivery system 600 to facilitate the delivery of resources.

In some embodiments, wherein the computer terminal 500 is a point of transaction device, the computer terminal may execute payment application 580 to initiate functionality configured to conduct a transaction, such as initiating the functionality that allows a near field communication payment terminal to conduct transactions with a user's mobile phone. In some embodiments, the computer terminal 500 may communicate with a merchant or an entity managing the account of the merchants to conduct and/or complete the transactions.

In some embodiments, wherein the computer terminal 500 is an Automated Teller Machine (ATM), the computer terminal may execute the authentication application 570 to authentication a user initiating a transaction, payment application 580 to initiate functionality configured to conduct a transaction initiated by a user. The network communication interface 510 allows communication with the entity system 400 and resource delivery system 600 to complete the transaction initiated by the user. In some embodiments, the computer terminal 500 is capable of dispensing physical items by communicating with the resource delivery system 600, wherein the physical items may include cash, checks or the like.

Additionally, as illustrated in FIG. 5, computer terminal 500 also includes payment terminal 590 operatively coupled to processing device 520. In an embodiment, payment terminal 590 is a NFC payment terminal that allows mobile device 200 to conduct financial transactions using e-wallet functionality. In an embodiment, payment terminal 590 may be located external to the rest of computer terminal 500. Although not depicted in FIG. 6, in some embodiments of the invention, payment terminal 590 may include a processor, memory device, and communication interface.

In some embodiments, the computer terminal 500 may include any number of other devices (not shown) allowing the computer terminal to transmit/receive data to/from a user, such as a keypad, keyboard, touch-screen, touchpad, microphone, mouse, joystick, other pointer device, button, soft key, receipt printers, dispensers (e.g., cash dispensers, check dispensers, ticket dispensers, merchandise dispensers, and the like), card readers (e.g., for reading the magnetic strip on magnetic cards such as ATM, debit, credit, and/or bank cards, and the like), deposit mechanisms (e.g., for depositing checks and/or cash, and the like), and/or other input/output device(s). In some embodiments, the computer terminal may include one or more speakers (not shown) configured to direct sound so that a user of the computer terminal 500 can hear sound from the speakers, but others cannot hear such sound. Accordingly, the speakers may be used to provide private information (e.g., account information) to a user of the computer terminal (e.g., a visually impaired user). In some embodiments, the computer terminal 500 may include a camera.

FIG. 6 presents a block diagram illustrating the resource delivery system 600, in accordance with embodiments of the invention. As illustrated in FIG. 4, in one embodiment of the invention, the resource delivery system 600 includes one or more processing devices 620 operatively coupled to a network communication interface 610 and a memory device 650. In certain embodiments, the resource delivery system 600 is operated by an entity, such as a financial institution.

It should be understood that the memory device 650 may include one or more databases or other data structures/repositories. The memory device 650 also includes computer-executable program code that instructs the processing device 620 to operate the network communication interface 610 to perform certain communication functions of the resource delivery system 600 described herein. For example, in one embodiment of the resource delivery system 600, the memory device 650 includes, but is not limited to, a network server application 670, an authentication application 660, a resource delivery application 680, a record application 685, and an entity application 690 including a web server application 693, and other computer-executable instructions or other data. The computer-executable program code of the network server application 670, the authentication application 660, the resource delivery application 680, or the web server application 693 may instruct the processing device 620 to perform certain logic, data-processing, and data-storing functions of the resource delivery system 600 described herein, as well as communication functions of the resource delivery system 600. The entity application 690 communicates with the user devices to facilitate communication between the user and the entity.

In some embodiments, the resource delivery application 680 allows communication with the resource delivery system 600 using the network communication interface 410. In one embodiments, the record application 685 manages a set of records associated with a plurality of users created by the resource delivery system 600. In some embodiments, the resource delivery application 680 may create a virtual record to process and complete delivery of the resources. In some embodiments, the record application 685 manages the virtual records created by the resource delivery application 680 and one or more records associated with the user, wherein the records may include accounts.

As used herein, a "communication interface" generally includes a modem, server, transceiver, and/or other device for communicating with other devices on a network. The network communication interface 610 is a communication interface having one or more communication devices configured to communicate with one or more other devices on the network 150, such as the mobile device 200, the personal computing device 300, and/or other computing devices 301. The processing device 620 is configured to use the network communication interface 610 to transmit and/or receive data and/or commands to and/or from the other devices connected to the network 150.

FIG. 7 presents a block diagram illustrating the automated resource delivery vehicle 700 in accordance with embodiments of the invention. As illustrated in FIG. 5, the automated resource delivery vehicle includes, but is not limited to a network communication interface 710, a propulsion system 720, a processor 725, a control system 730, a positioning system 740, a sensor module 750, a memory 760 which comprises a resource delivery application 770, and a delivery mechanism 780. The control system 730 may be any system which controls the propulsion system 720, wherein the control system may receive inputs from the sensor module 750, the positioning system 740, resource delivery application 770, or the like. The delivery mechanism 780 may be any mechanism for delivering, receiving, holding a physical item (e.g., cash, check). In some embodiments, the delivery mechanism may be a cavity inside the automated resource delivery vehicle 700. In one embodiment, the delivery mechanism 780 communicates with the resource delivery application 770 stored in the memory and the processor 725 to deliver resources to a user.

In some embodiments, the automated resource delivery vehicle 700 communicates with the resource delivery system 600 and other devices on the network 150 using the network communication interface 710. In some embodiments, the resource delivery application 770 may cause the processor 725 to perform certain logic, data-processing, and data-storing functions of the automated resource delivery vehicle 700 described herein. In some embodiments, the processor 725 may provide data to the propulsion system 720 and control system 730 based on the data extracted from the positioning system 740 and sensory module 750.

In an embodiment of the present invention, the automated resource delivery vehicle 700 delivers physical items to a location after receiving control signals from the resource delivery system 600 using the network communication interface 710 and resource delivery application 770. The physical items may include cash, checks, or the like. The delivery of physical items is performed by processor 725, propulsion system 720, and control system 730 of the automated resource delivery vehicle 700. In some embodiments, the automated resource delivery vehicle 700 may include any number of other devices (not shown) allowing the vehicle 700 to transmit/receive data to/from a user, such as a keypad, keyboard, touch-screen, touchpad, microphone, mouse, joystick, other pointer device, button, soft key, receipt printers, dispensers (e.g., cash dispensers, check dispensers, ticket dispensers, merchandise dispensers, and the like), card readers (e.g., for reading the magnetic strip on magnetic cards such as ATM, debit, credit, and/or bank cards, and the like), deposit mechanisms (e.g., for depositing checks and/or cash, and the like), and/or other input/output device(s). In some embodiments, the devices such as keypad, keyboard, touch screen, or the like may be used to authenticate a user and the processor of the automated resource delivery vehicle may cause the delivery mechanism 780 to deliver resources to the user upon successful authentication.

FIG. 8 presents a process flow 800 implemented by the resource delivery system 600 to deliver resources via an automated channel and a virtual record. As shown in block 810, the resource delivery system 600 receives a request from a first user to transfer resources to a second user. In some embodiments, the first user and the second user may be customers of the entity system 400. In some embodiments, the first user is a customer of the entity system 400 and the second user is not a customer of the entity system 400. In some embodiments, the first user is not a customer of the entity system 400 and the second user is a customer of the entity system 400. In some embodiments, the resource delivery system 600 in response to receiving the request from the first user, prompts the first user to input identifying information associated with the second user. The identifying information may include first name, last name, account number, and/or the like. In some embodiments, the resource delivery system 600 prompts the first user to identify an existing agreement between the first user and the second user. For example, the first user may have an agreement with the second user before initiation of the transfer of the resources, wherein the agreement requires approval from the second user and the first user to complete the transfer of the resources.

As shown in block 820, the resource delivery system 600 authenticates the first user to initiate the transfer of the resources. In some embodiments, authenticating the first user may include prompting the first user to provide authentication information. "Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, in response to authenticating the first user, the resource delivery system 600 communicates with an entity managing a record associated with the first user to determine that the record has sufficient resources to initiate the transfer of the resources. A record described herein may be an account such as a savings account, a checking account, a debit card account, a credit card account, an investment account, and/or the like. For example, the first user may request to transfer $X.XX to the second user, the system 600 checks if the savings account associated with the first user has $X.XX and upon determining that the savings account has $X.XX, the system 600 initiates the transfer of funds.

As shown in block 830, the resource delivery system 600 creates a virtual record and associates at least one record of the second user with the virtual record. The virtual record may be an account maintained by the entity system 400 or a third party system and the virtual account is different from the accounts (e.g., checking account, savings account, or the like) of a user. In some embodiments, only the first user may have access to the virtual account, wherein the first user may deposit and/or withdraw resources from the virtual account. In such an embodiment, the second user may not access to the virtual account, wherein the second user may utilize resources only after receiving consent from the first user. In some embodiments, the virtual record may be created for each user associated with the entity system 400. For example, the entity system has X number of customers, the system 600 creates X virtual accounts and stores the virtual accounts in the memory of the system 600. In some embodiments, the virtual record may be a unified record wherein unified record serves as a single central repository for managing resources associated with multiple transfers. In such an embodiment, the single central repository comprises a ledger, wherein the ledger comprises information associated with the multiple transfers. For example, the entity system may create one single unified account for all customers of the entity and may maintain a ledger to track all the incoming or outgoing transactions, wherein the ledger contains information such as user name, account number, or the like associated with the first user and the second user, transaction amount, transaction identification number and/or the like. In some embodiments, the virtual record may be a single use record. For example, a virtual record may be created to handle a transfer of resources and after completion of the transfer of resources, the system 600 deletes the virtual record and creates another virtual record for a new transfer of resources. In some embodiments, the virtual record is created after initiation of the transfer of resources. As noted, the system 600 typically associates a record of the second user with the virtual record. The record may be a payment vehicle, a mobile wallet, a checking account, a savings account, and/or the like. For example, the system 600 links the mobile wallet of the second user with the virtual record and upon detecting any activity in the mobile wallet, the system 600 determines if any resources exist in the virtual record to provide an option of using the resources in the virtual account to the second user.

As shown in block 840, the resource delivery system 600 transfers the resources to the virtual record via an automated channel. In some embodiments, the automated channel may be any channel, a mechanism, a backend system or a path for transferring resources from a record to the virtual record or from the virtual record to a record. In some embodiments, the automated channel may be a communication link between the resource delivery system and any other system. In some embodiments, the automated channel may be a portal maintained by the entity system 400 or by a third party system. In some embodiments, when the record associated with the first user and the record associated with the second user are not maintained by the same entity system, the automated channel serves as a path to automatically transfer resources from one entity to another entity. In some embodiments, the automated channel may be defined as a system which facilitates the transfer of resources from a first record to a second record. In some embodiments, the automated channel may be defined as a system facilitating the conversion of virtual funds stored in a virtual record into physical items representing the virtual funds, wherein the physical item may be cash or a check and/or the like. For example, virtual funds of value X are stored in the virtual record, the automated channel facilitates the conversion of virtual funds to cash corresponding to the value X. In some embodiments, the resources are transferred to the virtual record and remain in the virtual record until both the first user and the second user fulfill the terms in an agreement, wherein the agreement is created before the initiation of transfer of the resources. For example, the first user and the second user may have an agreement X, wherein the agreement X may comprise terms and conditions for the transfer of funds from the virtual record and only when both the first user and the second user approve, the funds from the virtual record may be used by the second user or may be retracted by the first user. In some other embodiments, the first user may impose a condition when sending the request to transfer the funds to the second user and funds transferred to the virtual record may be used by the second user only when the condition has been met. For example, the first user may place a condition, wherein the condition may be using the funds only at a merchant X. Upon transferring the funds to the virtual record, the second user may use the funds present in the virtual record only at the merchant X. In some embodiments, the first user may withdraw the resources transferred into the virtual account before the second user uses the resources. For example, the first user may identify that the first user has provided incorrect identifying information associated with the second user after authorizing the transfer of the resources. In response to identifying, the first user may withdraw the resources transferred to the virtual account. In one embodiment, the system 600 upon transferring the resources to the virtual record notifies a user device of the second user of the resources available in the virtual record. For example, the system 600 sends a notification by causing a graphical user interface of the mobile phone of the second user to display a message about the resources available in the virtual account.

As shown in block 850, the resource delivery system 600 identifies an event and, in response to identifying the event, the system 600 provides at least one option to the second user, wherein the at least one option comprises using the resources in the virtual record. The event may be the initiation of a transaction such as transfer of funds between multiple accounts, transfer of funds to another user, withdrawal of resources at an Automated Teller Machine, payment at a point of transaction device, online transaction using the mobile wallet, and/or the like. In some embodiments, the event may be initiated by the second user on a first device, wherein the first device may be the computer terminal 500 (e.g., point of transaction device, an Automated Teller Machine), a mobile device 200, and/or the like. The resource delivery system 600 identifies initiation of the event and provides the second user an option to use the resources present in the virtual record. For example, the system 600 may detect initiation of a payment at a point of transaction device and may prompt the user to utilize the resources available in the virtual record to complete the payment. In another instance, the system 600 may detect initiation of a payment using a digital wallet on a mobile phone of a user and may prompt the user to utilize the resources available in the virtual record to complete the payment. In another instance, the system 600 may detect initiation of withdrawal of funds at an Automated Teller Machine by a user and may prompt the user to utilize the resources available in the virtual record to complete the withdrawal of funds as opposed to utilizing the resources in one or more accounts (e.g., savings account, checking account) of the user to complete the withdrawal of funds. In such an instance, the system 600 may prompt the user to utilize the resources available in the virtual account only when the resources available in the one or more accounts of the user are below a defined limit. In some embodiments, identifying the event comprises determining the transfer of the resources to the virtual record has been completed. Accordingly, the option may be provided to the second user based on the transfer of the resources to the virtual account being completed, rather than waiting for a subsequent transaction.

As shown block 860, the system moves the resources from the virtual record via the automated channel based on identifying that the second user selected the option comprising using the resources stored in the virtual record. Moving resources may be a transfer of physical items, such as cash, corresponding to the resources, moving resources to a merchant providing services to the second user, transfer of physical items to a location, and/or the like. In some embodiments, moving the resources may include communicating with the computer terminal 500 and transmitting a control signal to the computer terminal to dispense a physical item corresponding to the resources in the virtual record. The computer terminal may be an Automated Teller Machine, a point of transaction device, or the like. The physical item may be defined as cash, check, and/or the like. For example, after receiving a prompt from the system 600 about the resources in the virtual account, the second user may choose to receive cash corresponding to the resources in the virtual account via the automated teller machine. The system 600 then converts the virtual resources available in the virtual record to physical resources, such as cash, by transmitting the control signal to the automated teller machine to dispense the physical resources.

In some embodiments, moving the resources may include communicating with the automated resource delivery vehicle 700, determining a location for delivering physical items corresponding to the resources available in the virtual record and transmitting a control signal to the automated resource delivery vehicle to deliver physical items to the location. In some embodiments, the location for delivering physical items comprises receiving the location from the user devices such as computing device 300, other computing device 301, mobile device 200, and/or the like. In some embodiments, the location may be received by the system 600 as an input from the second user. In some other embodiments, the location may be received by the system 600 as an input from the first user. In one embodiment, the location may be determined by contacting a network provider. In some embodiments, in response to receiving the control signal, the automated resource delivery vehicle delivers physical items corresponding to the resources in the virtual record.

In one embodiment, the resource delivery system 600 may permit the first user to retract the resources transferred to the virtual record from the record of the first user as long as the resources have not been utilized completely by the second user from the virtual account. For example, the first user authorizes a transfer of $X.XX from a savings account and the system 600 transfers $X.XX to the virtual account. The second user may utilize part of the funds in the virtual record and the system 600 may allow the first user to retract the remaining funds from the virtual record to the savings account.

In another embodiment, the resource delivery system 600 may permit the first user to retract the resources or allow the second user to utilize the resources, only when both the first user fulfill the terms of an agreement, wherein the agreement is created before the initiation of transfer of resources by the first user. For example, the first user is buying a car worth $X.XX from the second user. The first user or the second user may create an agreement with terms and conditions and associate the agreement with the transfer of funds (of value $X.XX), wherein the terms and conditions may include locking the funds transferred to the virtual account until an approval has been received from both the first user and the second user. The first user initiates the transfer of the funds from a savings account and the system 600 creates a virtual account to transfer the funds from the savings account to the virtual account. After the transfer of the funds to the virtual account has been completed, the system 600 assigns a first lock on the funds in the virtual account, wherein the first lock prevents the second user from utilizing the funds in the virtual account. The system 600 may send a notification about the funds in the virtual account to the second user and in response to receiving the notification, the second user ships the car to the first user and notifies the system 600 about the shipment. The system 600 assigns a second lock on the funds in the virtual account, wherein the second lock prevents the first user from retracting the funds from the virtual account. Upon receiving the car, the first user notifies the system 600 and the system 600 releases the first lock allowing the second user to utilize the funds. In an embodiment, wherein the first user is not satisfied with the car, the first user may ship the car back to the second user and notify the system 600 of the shipment. Upon receiving the car, the second user notifies the system 600 and the system 600 releases the second lock allowing the first user to retract the funds transferred to the virtual account.

In one exemplary embodiment, the first user initiates the transfer of resources by accessing the resource delivery application or entity application on the mobile device of the first user. The system 600 receives the request from the first user to transfer the resources to the second user and prompts the first user to provide username and password to initiate the transfer of the resources. The system 600 creates a virtual account for the transfer of the resources. The system transfers the resources to the virtual account and notifies the second user by sending a notification to the mobile phone of the second user. In response to receiving the notification, the second user accesses the resource delivery application on the mobile phone and chooses, from one or more options, an option of delivering the resources in the virtual account to a location using the automated resource delivery vehicle. The system 600, upon receiving the option, determines the location of the user by communicating with the mobile phone and delivers cash corresponding to the resources in the virtual account to the location using the automated resource delivery vehicle.

In another exemplary embodiment, the resource delivery system transfers the resources to the virtual account and identifies initiation of a payment to a merchant at a point of sale device by the second user. In response to identifying the initiation of the payment, the system 600 sends a notification to the second user indicating the availability of the resources in the virtual account and the provides an option of using the resources to complete the payment. In response to receiving the option of using the resources from the second user, the system 600 allows the second user to complete the payment to the merchant using the resources from the virtual account. In one particular embodiment, the system determines availability of the resources in the virtual account after completion of the payment and prompts the user to transfer the resources to a mobile digital wallet or to an account of the second user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for delivering resources via an automated channel, the system comprising:
 a computer apparatus including a processor and a memory; and
 a software module stored in the memory, comprising executable instructions that when executed by the processor cause the processor to:
  receive a request from a first user to transfer resources to a second user, wherein the resources are in a user account maintained by an entity;
  authenticate the first user to initiate the transfer of the resources;
  create a virtual record and associate at least one record of the second user with the virtual record, wherein the virtual record is an account maintained by the entity that is not a user account, wherein the virtual record is accessible by the first user and not the second user;
  transfer the resources to the virtual record via an automated channel;
  identify an event and provide the second user, in response to identifying the event, at least one option, wherein the at least one option comprises using the resources in the virtual record, wherein based on the event the second user gains access to the virtual record based on the first user providing consent for the second user to gain access to the virtual record upon the event occurrence; and
  move the resources from the virtual record via the automated channel based on identifying that the second user selected the option comprising using the resources stored in the virtual record.

2. The system of claim 1, wherein identifying the event comprises determining that the transfer of the resources to the virtual record has been completed.

3. The system of claim 1, wherein:
 the system further comprises an automated resource delivery vehicle in communication with the computer apparatus, wherein the automated resource delivery vehicle comprises a control system and a propulsion system;
 the software module stored in the memory comprises executable instructions that when executed by the processor cause the processor to move the resources by:
  determining a location for delivering one or more physical items corresponding to the resources available in the virtual record; and
  transmitting a control signal to the automated resource delivery vehicle based on determining the location;

the automated resource delivery vehicle is configured in response to receiving the control signal to deliver the one or more physical items corresponding to the resources in the virtual record to the location.

4. The system of claim 3, wherein determining the location comprises receiving the location from a user device of the second user.

5. The system of claim 1, wherein the system further comprises a computer terminal in communication with the computer apparatus, and wherein the software module stored in the memory comprises executable instructions that when executed by the processor cause the processor to move the resources by:
transmitting a control signal to the computer terminal, wherein the control signal causes the computer terminal to dispense a physical item corresponding to the resources in the virtual record.

6. The system of claim 1, wherein the software module stored in the memory comprises executable instructions that when executed by the processor cause the processor to notify the second user of the resources available in the virtual record based on transferring the resources to the virtual record via the automated channel.

7. The system of claim 1, wherein the virtual record is a single use account.

8. The system of claim 1, wherein the event is initiated by the second user on a first device.

9. The system of claim 8, wherein the first device is a point of transaction device operated by a merchant, wherein the event comprises initiation of a transaction by the second user via the point of transaction device, and wherein moving the resources comprises transferring the resources in the virtual record to a record associated with the merchant.

10. A computer program product for delivering resources, wherein the computer product comprises a non-transitory computer-readable storage medium having computer-executable instructions to:
receive a request from a first user to transfer resources to a second user, wherein the resources are in a user account maintained by an entity;
authenticate the first user to initiate the transfer of the resources;
create a virtual record and associate at least one record of the second user with the virtual record, wherein the virtual record is an account maintained by the entity that is not a user account, wherein the virtual record is accessible by the first user and not the second user;
transfer the resources to the virtual record via an automated channel;
identify an event and provide the second user, in response to identifying the event, at least one option, wherein the at least one option comprises using the resources in the virtual record, wherein based on the event the second user gains access to the virtual record based on the first user providing consent for the second user to gain access to the virtual record upon the event occurrence; and
move the resources from the virtual record via the automated channel based on identifying that the second user selected the option comprising using the resources stored in the virtual record.

11. The computer program product of claim 10, wherein identifying the event comprises determining that the transfer of the resources to the virtual record has been completed.

12. The computer program product of claim 10, wherein the non-transitory computer-readable storage medium further comprises computer-executable instructions to move resources by:
determining a location for delivering one or more physical items corresponding to the resources available in the virtual record; and
transmitting a control signal to an automated resource delivery vehicle based on determining the location, wherein the control signal is configured to cause the automated resource delivery vehicle to deliver the one or more physical items corresponding to the resources in the virtual record to the location.

13. The computer program product of claim 12, wherein determining the location further comprises receiving the location from a user device of the second user.

14. The computer program product of claim 10, wherein the non-transitory computer-readable storage medium further comprises computer-executable instructions to move resources by transmitting a control signal to a computer terminal, wherein the control signal is configured to cause the computer terminal to dispense a physical item corresponding to the resources in the virtual record.

15. The computer program product of claim 10, wherein the event is initiated by the second user on a first device.

16. The computer program product of claim 15, wherein the first device is a point of transaction device operated by a merchant, wherein the event comprises initiation of a transaction by the second user via the point of transaction device, and wherein moving the resources comprises transferring the resources in the virtual record to a record associated with the merchant.

17. A computerized method for delivering resources, wherein the method comprises:
receiving, by a processor, a request from a first user to transfer resources to a second user, wherein the resources are in a user account maintained by an entity;
authenticating, by the processor, the first user to initiate the transfer of the resources;
creating, by the processor, a virtual record and associate at least one record of the second user with the virtual record, wherein the virtual record is an account maintained by the entity that is not a user account, wherein the virtual record is accessible by the first user and not the second user;
transferring, by the processor, the resources to the virtual record via an automated channel;
identifying, by the processor, an event and provide the second user, in response to identifying the event, at least one option, wherein the at least one option comprises using the resources in the virtual record, wherein based on the event the second user gains access to the virtual record based on the first user providing consent for the second user to gain access to the virtual record upon the event occurrence; and
moving, by the processor, the resources from the virtual record via the automated channel based on identifying that the second user selected the option comprising using the resources stored in the virtual record.

18. The method of claim 17, comprising moving the resources by:
determining a location for delivering one or more physical items corresponding to the resources available in the virtual record; and
transmitting a control signal to an automated resource delivery vehicle based on determining the location, wherein the control signal is configured to cause the automated resource delivery vehicle to deliver the one or more physical items corresponding to the resources in the virtual record to the location.

19. The method of claim 18, wherein determining the location further comprises receiving the location from a user device of the second user.

20. The method of claim 17, wherein moving the resources transmitting a control signal to a computer terminal, wherein the control signal is configured to cause the computer terminal to dispense a physical item corresponding to the resources in the virtual record.

\* \* \* \* \*